United States Patent
Ravishankar et al.

(10) Patent No.: US 10,840,999 B2
(45) Date of Patent: Nov. 17, 2020

(54) SYSTEM AND METHOD FOR NETWORKED SCHEDULING FOR IMPROVED SPECTRAL EFFICIENCY

(71) Applicants: Channasandra Ravishankar, Clarksburg, MD (US); Xiaoling Huang, Germantown, MD (US); Nassir Benammar, Rockville, MD (US); Rajeev Gopal, Germantown, MD (US); John Corrigan, Germantown, MD (US)

(72) Inventors: Channasandra Ravishankar, Clarksburg, MD (US); Xiaoling Huang, Germantown, MD (US); Nassir Benammar, Rockville, MD (US); Rajeev Gopal, Germantown, MD (US); John Corrigan, Germantown, MD (US)

(73) Assignee: Hughes Network Systems, LLC, Germantown, MD (US)

(*) Notice: Subject to any disclaimer, the term of this patent is extended or adjusted under 35 U.S.C. 154(b) by 0 days.

(21) Appl. No.: 15/832,981

(22) Filed: Dec. 6, 2017

(65) Prior Publication Data
US 2019/0068276 A1 Feb. 28, 2019

Related U.S. Application Data

(60) Provisional application No. 62/552,359, filed on Aug. 30, 2017.

(51) Int. Cl.
*H04L 27/28* (2006.01)
*H04B 7/185* (2006.01)
(Continued)

(52) U.S. Cl.
CPC ..... *H04B 7/18519* (2013.01); *H04B 7/18517* (2013.01); *H04B 7/18526* (2013.01);
(Continued)

(58) Field of Classification Search
CPC .... H04B 7/2041; H04B 7/024; H04B 7/0617; H04W 16/10; H04W 40/16; H04W 72/04
(Continued)

(56) References Cited

U.S. PATENT DOCUMENTS 6,507,742 B1    1/2003   Lin et al.
2009/0042562 A1*  2/2009   Treesh ................ H04B 7/2041
                                           455/428

(Continued)

OTHER PUBLICATIONS

Christopoulos Dimitrios et al, "Multi-User Detection in Multibeam Mobile Satellite Systems: A Fair Performance Evaluation", 2013 IEEE 77th Vehicular Technology Conference (VTC Spring), IEEE Jun. 2, 2013, pp. 1-5, XP032547814, ISSN: 1550-2252, DOI: 10.1109/VTCSPRING.2013.6692647 [retrieved on Dec. 22, 2013] paragraph [0001] paragraph [0111].
(Continued)

*Primary Examiner* — Tu X Nguyen
(74) *Attorney, Agent, or Firm* — Capitol City Techlaw; Jasbir Singh

(57) ABSTRACT

A method for networked scheduling is disclosed. The method includes: providing a gateway; a plurality of channels assigned to a color reuse scheme including colors, wherein some of the plurality of channels assigned to one of the colors comprise a set of co-channels; associating the set of co-channels with the gateway; generating a traffic pattern for the set of co-channels for an upcoming allocation slot; determining a channel state of each co-channel in the set of co-channels per the traffic pattern; and setting a Modulation and Coding scheme (MODCOD) of each co-channel in the set of co-channels based on the respective channel state.

24 Claims, 6 Drawing Sheets

(51) Int. Cl.
*H04L 29/06* (2006.01)
*H04W 52/26* (2009.01)
*H04W 84/06* (2009.01)
*H04W 72/08* (2009.01)
*H04W 72/12* (2009.01)
*H04W 52/34* (2009.01)

(52) U.S. Cl.
CPC ... *H04B 7/18584* (2013.01); *H04L 29/06224* (2013.01); *H04W 52/262* (2013.01); *H04W 52/346* (2013.01); *H04W 72/085* (2013.01); *H04W 72/1231* (2013.01); *H04W 84/06* (2013.01)

(58) Field of Classification Search
USPC .......................................... 455/455, 451, 23
See application file for complete search history.

(56) References Cited

U.S. PATENT DOCUMENTS

| 2010/0120359 | A1* | 5/2010 | Agarwal | H04B 7/18539 |
| | | | | 455/12.1 |
| 2011/0169688 | A1* | 7/2011 | Wyler | H04B 7/195 |
| | | | | 342/354 |
| 2017/0215190 | A1 | 7/2017 | Chung | |
| 2017/0294996 | A1* | 10/2017 | Lee | H04B 7/18582 |

OTHER PUBLICATIONS

International Search Report for corresponding International Application No. PCT/US2018/047689 dated Nov. 16, 2018.

* cited by examiner

SYSTEM AND METHOD FOR NETWORKED SCHEDULING FOR IMPROVED SPECTRAL EFFICIENCY

CROSS REFERENCE TO RELATED APPLICATIONS

The present application claims the benefit of U.S. Provisional Patent Application No. 62/552,359, filed Sep. 22, 2017, which is incorporated herein in its entirety by reference.

FIELD

The present teachings improve throughputs seen by user terminals by jointly optimizing scheduling decisions and Modulation and Coding (MODCOD) selections via networked scheduling. In particular, the present teachings exploit the burst-centric non-uniform nature of data traffic and choose a MODCOD that is commensurate with the instantaneous traffic loading, for example, in satellite communications.

BACKGROUND

FIG. 1 illustrates a prior art beam level scheduler.

In the prior art, scheduling decisions are made at a beam level for satellite communications. A satellite communication system 100 includes a global resources manager 106 that managed a gateway's resources 108 (resources associated per gateway) using a gateway 104. The gateway's resources 108 included beams assigned to the gateway 104. A beam scheduler 102 managed a bandwidth allocation of the beam.

As shown in FIG. 1, the traditional approach is where global resources 108 in terms of frequency, power and their mapping to beams are distributed across geographically distributed gateways 104 in the coverage area and each gateway 104 autonomously manages its resources. Each gateway 104 implements a scheduler 102 per beam since user terminals (not shown) belonging (receiving service from) to a beam share the resources in that beam. For simplicity, FIG. 1 illustrates a scenario where each gateway 104 handles one beam for each given reuse color in a 4-color reuse scheme and therefore implements four such schedulers 102. The notation <fi,j> is a doublet that represents frequency i in beam j. It is noted that in such a framework, the scheduler 102 associated with frequency i in one gateway has no knowledge of the scheduling decisions made by a scheduler 102 associated with frequency i in a different gateway 104.

The traditional implementation 100, therefore, uses an initial MODCOD that is based on offline calculations and link budgets and subsequently changes MODCODs based on reported channel quality. This channel quality indicator provides the averaged net effect of noise and interference seen by the user terminal (not shown). However, in data systems that are bursty in nature, decisions based on channel quality reporting may not be optimal. The delay and averaging associated with channel quality reporting will be such that it may not be a reflection of the interference at the time at which transmission to a user terminal is scheduled in a forward link. Similarly, in the return link, channel quality estimation for a given user terminal at a given instant of time in the gateway 104 is a function of how many other user terminals in co-channel beams were simultaneously scheduled to transmit from other gateways.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Next generation satellite systems are expected to provide improved data rates via a combination of physical layer enhancements, beam-forming, interference cancellation and use of wider spectrum. The present teachings improve throughputs seen by user terminals by jointly optimizing scheduling decisions, and Modulation and Coding (MOD-COD) selections via networked scheduling. Unlike traditional scheduling mechanisms where scheduling decisions are made at a beam level, the present teachings disclose a scheduler that makes scheduling decisions across multiple co-channel beams. Resource allocation strategies across multiple gateways to aid this scheduling concept are also provided. Additional teachings enhancing spectral efficiencies based on user-terminal location-aware scheduling are also provided.

A method for networked scheduling is disclosed. The method includes: providing a gateway; a plurality of channels assigned to a color reuse scheme including colors, wherein some of the plurality of channels assigned to one of the colors comprise a set of co-channels; associating the set of co-channels with the gateway; generating a traffic pattern for the set of co-channels for an upcoming allocation slot; determining a channel state of each co-channel in the set of co-channels per the traffic pattern; and setting a Modulation and Coding (MODCOD) scheme of each co-channel in the set of co-channels based on the respective channel state.

A satellite communication system is disclosed. The system includes a gateway; a plurality of channels assigned to a color reuse scheme including colors, wherein some of the plurality of channels assigned to one of the colors comprise a set of co-channels; a global resources manager to associate the set of co-channels with the gateway; a scheduler to generate a traffic pattern for the set of co-channels for an upcoming allocation slot; and a networked scheduler to determine a channel state of each co-channel in the set of co-channels per the traffic pattern, and to set a Modulation and Coding (MODCOD) scheme of each co-channel in the set of co-channels based on the respective channel state.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be considered to be limiting of its scope, implementations will be described and explained with additional specificity and detail through the use of the accompanying drawings.

Figure 1:
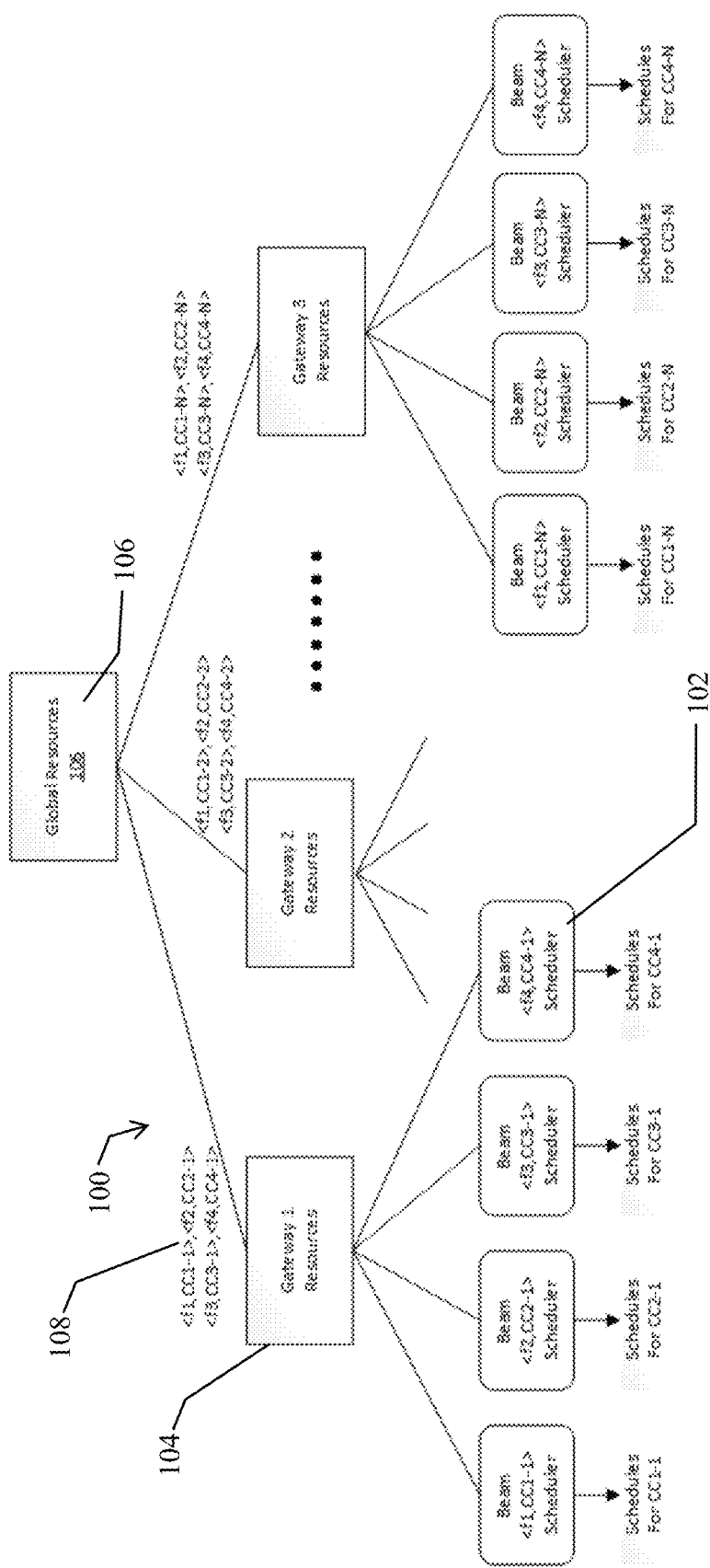
FIG. 1 illustrates a prior art beam level scheduler.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Communication satellites in the Geo-Synchronous Orbits (GSO) (and soon in non-GSO orbits as well) with High Throughput Satellite (HTS) technology provide broadband services to underserved and unserved populations today. HTS systems can employ very high data rate links utilizing state-of-the-art techniques such as Low-density Parity-Check (LDPC) Forward Error Correction (FEC) codes that are close to theoretical limits, and efficiency with, for example, 5% roll-off factors specified by the DVB-S2X standard. For example, even consumer terminals today can use a gigabit link using carrier bandwidths of 250 MHz. The HTS aggregate capacity is orders of magnitude higher compared to traditional wide beam satellites because of spectral reuse enabled by narrow spot beams.

Increases in HTS data rates are possible by utilizing one or more of the following techniques: addition of more spectrum and more power, additional physical and data link layer optimizations with finer control over transmitted power, use of higher frequency bands, and use of a higher Gain-to-noise (G/N) ratio user terminal. While these techniques in conjunction with higher order modulation schemes have the potential to provide improvements in noise-limited links, they fall short of addressing interference limited links. The present teachings focus on improving data rates with optimized decision making under the constraints of interference. Improvements in scheduling user traffic and making media access control decisions as a multi-dimensional trade across efficiency, fairness, and objective Quality-of-Service (QoS) for line-of-sight (LoS) satellite data links are disclosed.

The DVB and DVB-S2 waveform innovations started with Ku band wide beam satellites and realized their distinctive aggregate capacity gains and very high data rates in Ka-band. Ka-band has higher bandwidth allocation and can leverage low-cost narrow spot beams even with smaller aperture sizes (because of smaller Ka wavelength). Despite additional atmospheric attenuation in Ka-band (compared to Ku), the GEO HTS satellite systems continue to be designed mostly for Ka-band in user links because of cost and capacity reasons. Additional bandwidth for satellite systems may be available in higher bands (Q, V, and W) but they have significantly more attenuation to be used in user links. In addition, the higher bands also require RF and antenna technology development for both space and ground segments for any affordable implementation.

Additional gains in spectral efficiency over both Ku (which is used by one LEO HTS constellation for user links) and Ka (GEO HTS) are possible by increasing a Signal-To-Interference-plus-Noise ratio (SINR) of satellite links. HTS satellites have significantly more self-inflicted interference and optimal decision making while scheduling traffic codeblocks can reduce a power level of adjacent RF channels to improve SINR of a link under consideration. Interference considerations are typically dealt with at system design time. However, explicit consideration of interference at codeblock transmission level can systematically improve data rates especially when traffic is not uniformly distributed across spot beams.

The present teachings extend Multi-Frequency Time-Division Multiple Access (MF-TDMA) design for Line of Sight (LoS) links to include interference considerations as a multi-objective optimization including efficiency, fairness, and defined QoS. In some embodiments, a tiered scheme in an HTS satellite hub (gateway) included in an MF-TDMA traffic scheduler may be used. In some embodiments, a hierarchical scheduling architecture and coordination between gateways and between beams of a gateway for effective interference mitigation may be used.

In exemplary embodiments, the tiered bandwidth allocation performs allocation decisions at a high tier, a mid-tier and a low tier. In exemplary embodiments, the high tier allocations are performed with a high tier scheduler, the mid-tier allocations are performed by a mid-tier scheduler, and the low tier allocations are performed by a low-tier scheduler.

At the highest tier or level of optimized allocation, running, for example, every few minutes, historical traffic and current environmental trends (available with data analytics) provide broad guidelines for power levels and spectrum usage possibilities in each beam. The broad guidelines information is disseminated to geographically distributed Gateways responsible for one or more beams in the coverage area.

The mid-tier optimized allocation or decision-making considers a subset of the one or more beams to fine-tune the collection of the allowed spectrum based on demand. Dynamically modifying frequency assignments to beams is based on flexible frequency conversion in the payload. The mid-tier decision making may be run every few seconds to better adjust to both the varying offered traffic and environmental conditions (rain or interference from other systems).

The low-tier allocation or the fastest decision-making loop runs every few milliseconds similar to a traditional MF-TDMA scheduling and media access scheme. In some embodiments, traditional scheduling mechanisms where scheduling decisions are made at a beam level are used as the low-tier schedulers. In some embodiments, the low-tier schedulers make scheduling decisions across multiple co-channel beams to improve spectral efficiency and better meet the fairness and QoS objectives of the individual flows.

Resource Allocation Strategies for Efficient Scheduling

The resource management and the dynamic frequency planning is complemented with a Medium Access Control that maximizes the utilization of the available system resources and prioritizes resources to meet QoS requirements. Traditionally, the MAC and the QoS scheduler operate at the beam level and rely on a link adaptation process to provide feedback on a channel's quality and Modulation and Coding (MODCOD) selection. The link adaptation and channel quality is the result of the service link channel quality, noise level, and the average interference from all other sources, in particular, co-channel beams sources. In exemplary embodiments, the system may take advantage of instantaneous co-channel interference information for higher system efficiency. In some embodiments, the MODCOD selection may be based not only on the UT service link channel condition but also on instantaneous information of adjacent co-channel beam transmission information.

In some embodiments, coordination efforts among beam channels may be based on solutions in a terrestrial communication environment, for example, the Long Term Evolution (LTE) specification framework. The MODCOD selection at the time of transmission may be based on adjacent beam transmission information of the same transmission frame when available. However, the LTE process relies upon designing Physical (PHY) waveforms and provision of Channel State Information (CSI), Reference Signals and CSI Interference Measurement resource that assists in the determination of co-channel interference that the user terminal would have to report. The Line of Sight (LoS) satellite systems, on the other hand, do not need such PHY waveforms and experience co-channel interference that is predominantly a function of beam responses, reuse factors, number of co-channel cells, activity in co-channel cells and location of interferers with respect to the user of interest.

In order to take full advantage of adjacent co-channel beam information, the scheduler gathers and uses a channel metric that is a function of their states. In some embodiments, the state of an adjacent co-channel beam constitutes an indication of whether there is an active transmission and an associated power level. The channel metrics may also provide channel conditions, such as a Carrier to Noise ratio plus Interference (C/N+I), SNIR or the like. The channel metrics may provide the MODCOD selection based on the state of the channel, co-channel beams, and interferers. In some embodiments, the link budget may be calculated for multiple hypotheses on the state of the co-channel beams. The states, for example, whether co-channel beams were actively transmitting, need not be known to the UT; instead, a gateway may match the metrics to the appropriate states.

Figure 2:
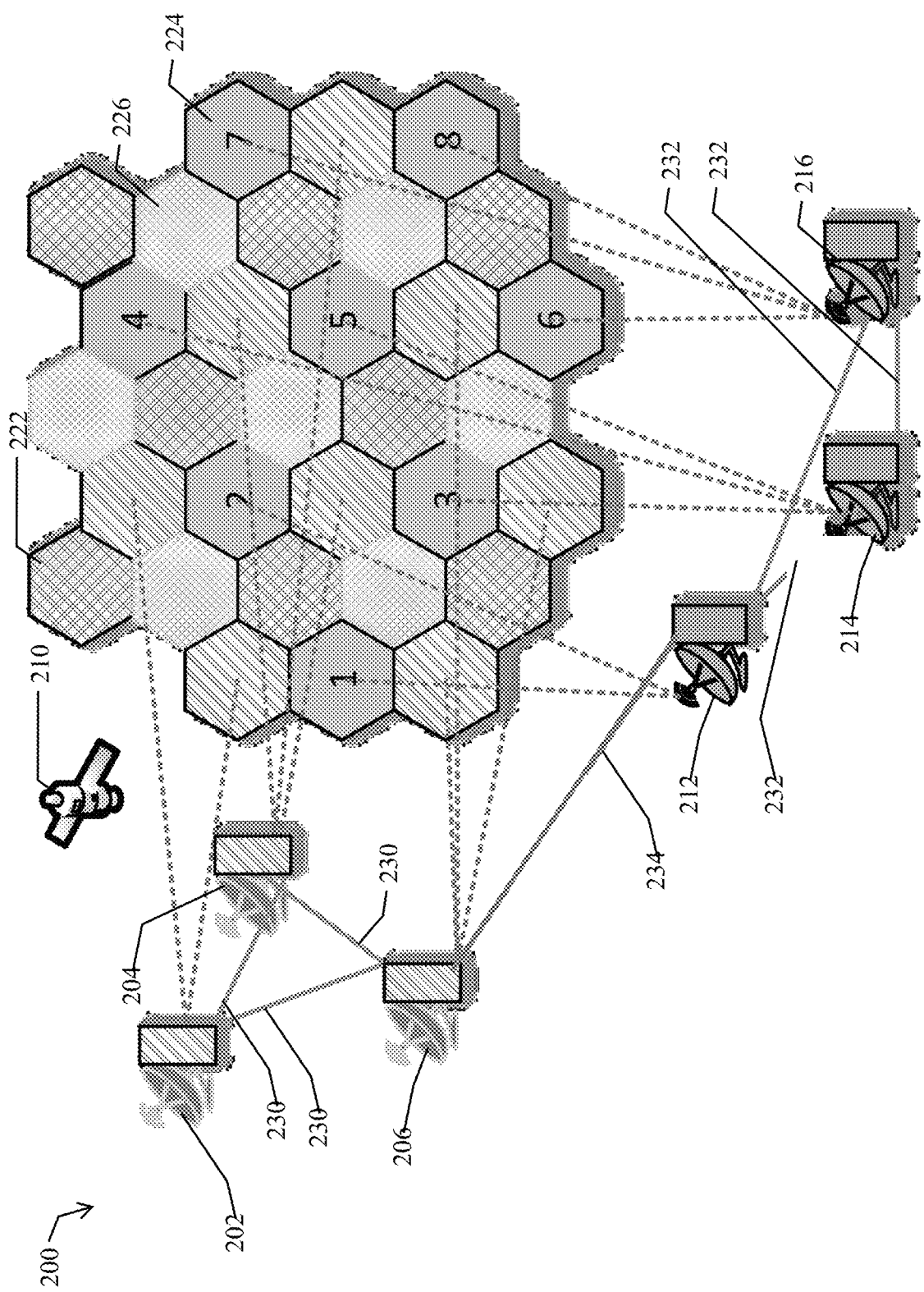
FIG. 2 illustrates a network architecture including an exemplary spot beam gateway association with an inter-gateway link.

FIG. 2 illustrates a network architecture including an exemplary spot beam gateway association with an inter-gateway link.

In an HTS communication system 200, there are usually multiple gateways 202, 204, 206, 212, 214, 216 deployed to provide communication over multiple spot beams. The multiple gateways 202, 204, 206, 212, 214, 216 may provide geographically distributed stems from the HTS communication system 200 for an aggregate throughput from multiple spots beams 222, 224, 226 and to overcome limitations on, for example, a bandwidth of one or more feeder links (not shown) connected to the HTS communication system 200. The multiple spot beams 222, 224, 226 may include light-grey colored co-channel beams 226, mid-grey colored co-channel beams 222, and dark-grey colored co-channel beams 224. The multiple spot beams 222, 224, 226 are provided by a satellite 210 communicating with the multiple gateways 202, 204, 206, 212, 214, 216 to communicate with one or more user terminals (not shown) by a coverage area of a beam of the multiple spot beams 222, 224, 226. The satellite 210 may include a line of sight satellite, a line of sight relay, a GEO satellite, an LEO satellite, a High Attitude platform (HAP), or the like.

Deploying multiple gateways 202, 204, 206, 212, 214, 216 multiplies the capacity on the feeder link needed for the HTS system 200. In the prior art, the feeder link/gateway to spot beam association is based on geographic decisions and satellite design and its carrier routing. Per the present teachings, with coordinated scheduling based on the co-channel state information, in exemplary embodiments, the association of spot beams to a gateway may be based on spot beam carrier frequency. For example, a gateway or a group of gateways may be assigned to a plurality of spot beams that have the same frequency. In some embodiments, a gateway or a group of gateways may be assigned to a plurality of first spot beams that have the same frequency/polarization and a plurality of second spot beams interfering with the frequency/polarization of the first spot beams. The gateways assigned the same spot beam frequency may be connected with an inter-gateway link 230, 232 to provide coordination across the gateways. The inter-gateway link 230, 232 may include a high speed, low delay link, for example, a terrestrial link. An example of a spot beam gateway association is illustrated in FIG. 2. In FIG. 2, the gateways 202, 204, 206 are assigned and deal with (manage) the mid-grey colored co-channel beams 222 over the inter-gateway link 230, and the gateways 212, 214, 216 are assigned and deal with (manage) the dark-grey colored co-channel beams 224 over the inter-gateway link 232. An inter-gateway 234 may coordinate between the gateways 202, 204, 206 and the gateways 212, 214, 216.

With the inter-gateway links 230, 232, 234, there are multiple approaches that gateways 202, 204, 206, 212, 214, 216 and their schedulers (not shown) can employ to take advantage of the shared information. For example, each gateway 202, 204, 206, 212, 214, 216 may advertise in a multicast message its activity in the next n frames, on which frames it intends to transmit based on user demand and active flow QoS, and the like. Based on the received multicast messages and co-channel beam activity, a gateway with high demand may adjust the MODCOD selection and operate with a higher spectral efficiency MODCOD while maintaining the same power level.

In some embodiments, one of the gateway 202, 204, 206, 212, 214, 216 could be designated a master scheduler and be fed information from the remaining gateways on traffic demand and QoS requirements using gateway inter-links 230, 232, 234. The master scheduler then allocates resource for all the gateways to optimize system throughput while taking into account QoS requirements. With the master scheduler, the MODCOD selection and channel spectral efficiency can, therefore, be optimized based on the resource allocations in all co-channel beams. In some embodiments, the master scheduler may prioritize certain high demand high priority flows in certain beams at the expense of other very low priority delay tolerant flows in other beams. For example, this may happen when beam capacity is lowered due to rain fade and admitted high priority flow guaranteed bit rates cannot be met under the prevailing conditions. In some embodiments, the priority of the flows may be determined by a subscription plan of an associated customer, delivery assurances, traffic-type (voice, video, data or the like).

It is noted that in global HTS systems such as LEO satellite systems where all traffic to a given satellite may be handled by a single gateway at a given instant of time, there is no need for inter-gateway communication. In that case, there only needs to be one scheduler per reuse color where the scheduler has visibility to the traffic being carried across all co-channel beams belonging to that reuse color. Therefore, this case becomes a special case of the multiple Gateway handling described above.

Network Scheduling

The present disclosure overcomes the sub-optimal MODCOD selection by (i) having visibility to what the schedulers associated with co-channel beams are allocating and (ii) making scheduling allocations in co-channel beams such that the MODCOD selection is optimal and the spectral efficiency is maximized.

Figure 3:
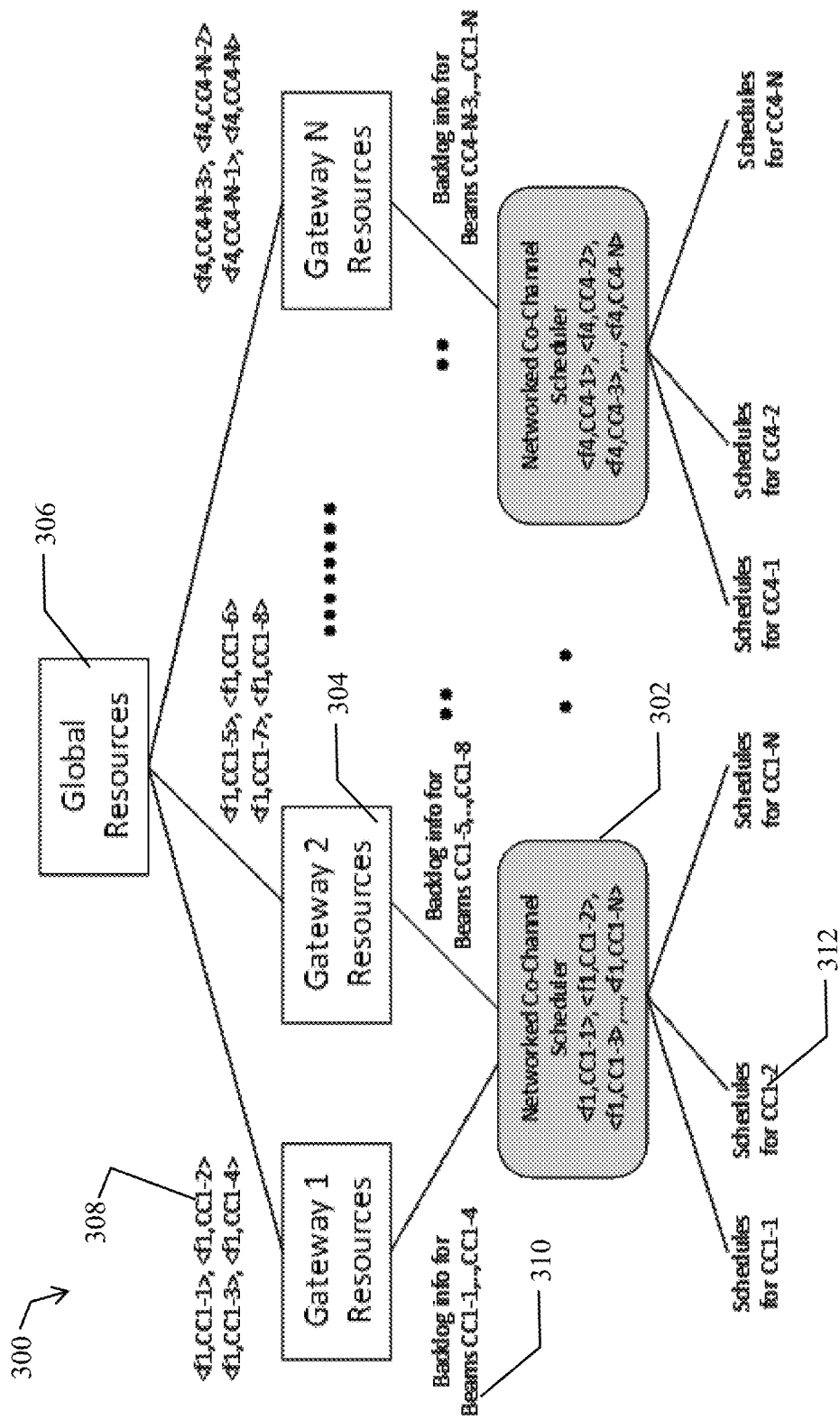
FIG. 3 illustrates a multi-beam networked co-channel scheduler according to various embodiments.

FIG. 3 illustrates a multi-beam networked co-channel scheduler according to various embodiments.

As illustrated in FIG. 3, a satellite communication system 300 may include a global resources manager 306 for managing a gateway's resources 308 (resources associated per gateway) using a gateway 304. The gateway's resources 308 may include beams assigned to the gateway 304. The system 300 may include a networked scheduler 302 that looks at the demand of traffic into multiple (in the best case all) co-channel beams and makes scheduling decisions to co-channel beams to minimize the number of simultaneous transmissions. The networked scheduler 302 maximizes overall Carrier to (Noise plus Interference) ratio (C/(N+I)) seen by a user terminal (not shown) thereby allowing a MODCOD of higher spectral efficiency to be used. The system 300 may be implemented using control plane interaction between the networked schedulers 302 and gateways 304 about a demand 310 seen by the gateways 304 at a mid-tier slot, for example, every few milliseconds. To minimize delays due to this control plane interaction, FIG. 3 illustrates another optimization consistent with the network architecture of the HTS communication system 200 of FIG. 2. In exemplary embodiments, the gateways 304 are allocated to beams that are co-channel beams. In some embodiments, gateways 304 that deal with co-channel beams of the same color may be disposed of geographically closer to each other. This may, without limitation, minimize the number of gateways with which the networked scheduler 302 interacts as well as the delay in interaction. In exemplary embodiments, the individual beams have to carry control traffic in addition to user data. It is also understood that there may be a need to transmit certain reference symbols in every burst in some systems. The networked scheduler 302 may be provided knowledge of this and can take such control and/or provisioning information into account to transmit a data portion of the burst.

Figure 4:
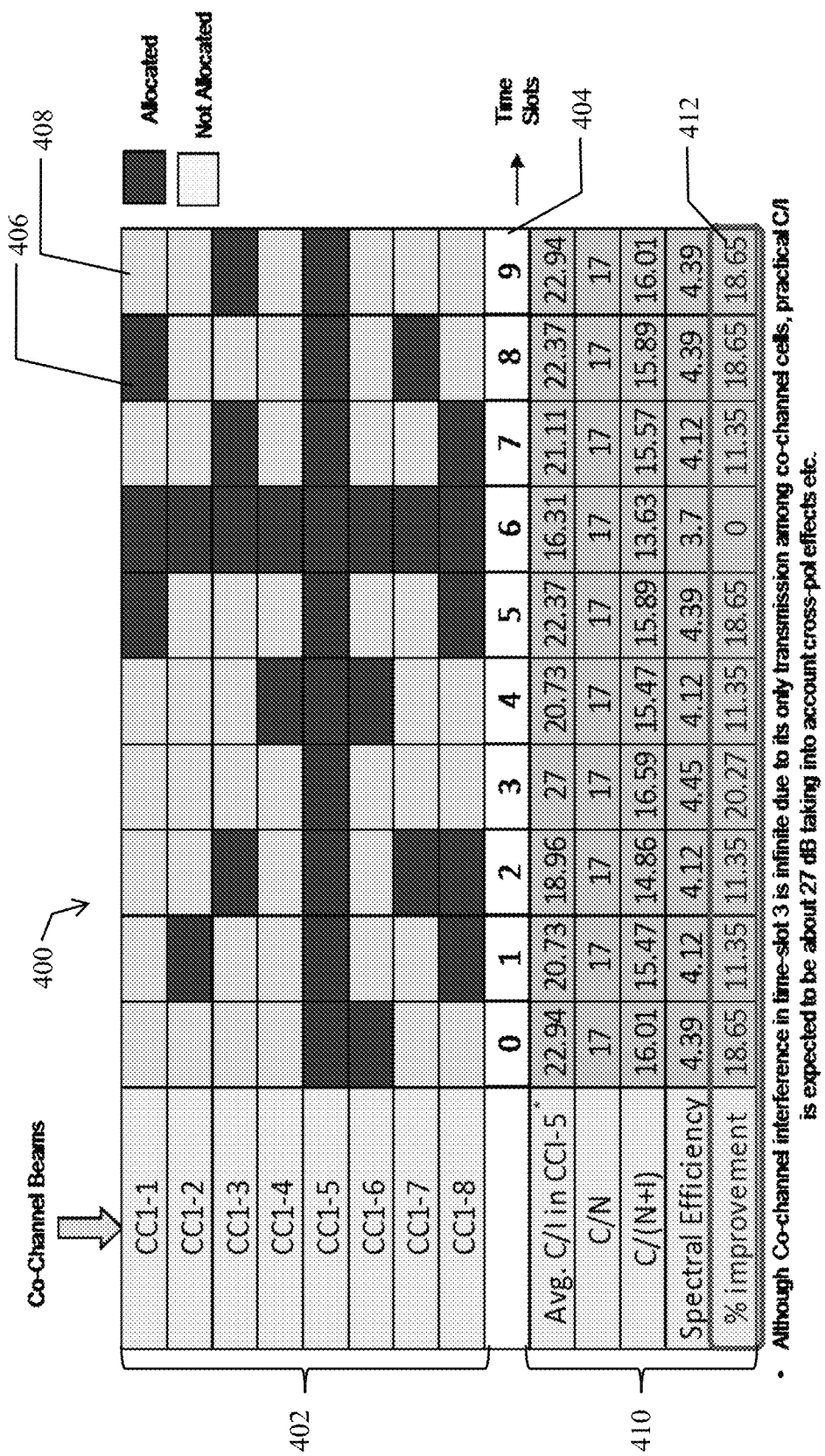
FIG. 4 illustrates a traffic pattern and a channel state for a set of co-channels according to various embodiments.

FIG. 4 illustrates a traffic pattern and a channel state for a set of co-channels according to various embodiments.

A networked scheduler may schedule transmissions to user terminals in a set of co-channel beams. In FIG. 4, a table 400 illustrates an example allocation of forward link transmissions for a set of eight co-channel beams at different time instants in a frame. The exemplary allocation is illustrated in the top half 402 of the table 400. A lower half 410 of the table 400 illustrates exemplary co-channels states for each allocation in slots 404 (here, for example, numbered 0-9) in a frame. In FIG. 4, a co-channel beam notation CCX-Y, where X represents the reuse color and Y represents the number of the beam belonging to that reuse color, is used. In FIG. 4, CC1-1 through CC1-8 (in a first column of the top half 402) represents, for example, the eight co-channel beams belonging to the dark-grey reuse color 224 of FIG. 2.

In an exemplary embodiment, an air interface design could be such that each time instant corresponds to slots in a TDMA frame structure, where for example, each slot 404 is 100 microseconds long and the networked scheduler makes scheduling decisions every 1 milliseconds (ms), i.e., 10 slots at a time. In FIG. 4, this is illustrated as 10 slots 404 numbered 0-9. Assuming that links are designed such that a Carrier to Noise ratio (C/N) is 17 dB. Carrier to Interference ratio (C/I) calculations may be performed for the beam layout shown in FIG. 2 assuming a 17.5 cm antenna per feed element on a satellite operating at 12.7 GHz.

The top half illustrates a traffic pattern 402 including bandwidth allocations for each slot in an upcoming frame for a set of co-channel beams. The traffic pattern 402 illustrates an upcoming allocated slot 406 in a dark grey color and an upcoming unallocated (not allocated) slot 408 is a light grey color. The traffic pattern 402 informed by the allocations may be based on the backlog information 310 of FIG. 3. As illustrated in the FIG. 4, the traffic pattern 402 is such that there are several instances of slots where all co-channel beams are not allocated. Therefore, most co-channel metrics for the set of co-channels should improve and indicate less interference. For example, an average C/I will be much better for a sparsely allocated set of co-channels in a particular slot than the average C/I of a densely or completely allocated set of co-channels. Hence C/(N+I) experienced by user terminals in beams that are active will improve as shown in a lower half of FIG. 4, for example, C/(N+I) of slots 0-5 and 7-9.

The network scheduler 302 of FIG. 3 calculates the channel state in the lower half 410 for each slot (upcoming allocation slot) and is, therefore, able to allocate a MODCOD commensurate with the C/(N+I) that will be experienced by users in the active beams. In this example, the MODCOD selection and the associated spectral efficiencies were based on DVB-S2 specification. A similar methodology can also be used using DVB-S2X specification. The associated spectral efficiency is, therefore, higher than a traditional scheduler that would have allocated based on assumption that all beams would be simultaneously active or used a conservative filtered average based on past link measurements that included co-channel interference. This percentage improvement is shown in the row 412 of table 400. As illustrated in row 412, there is no improvement when there is simultaneous transmission in all co-channel beams for a slot, for example, slot 6 in row 412.

When there is no network connectivity between the networked scheduler and a Gateway, the strategy of having a gateway handle beams of the same reuse color still provides an improvement in spectral efficiency since the scheduler in that gateway will have visibility to co-channel beams under the jurisdiction of the gateway. Scheduling decisions may take into account the QoS requirements associated with the traffic that is being scheduled. Once scheduling decisions are made to the individual beams, QoS differentiation within each beam can be carried out using techniques such as Weighted Fair Queueing (WFQ).

While the above description is focused on the forward link, the same process can be applied to a return link in order to take advantage of C/I improvements. The improvements can be gained as the networked scheduler will be the one determining or deciding the return link allocations.

In some embodiments, the present disclosure, of having a gateway handle co-channel beams of the same reuse color, maybe used to select and apply precoding techniques to aid in interference cancellation and to mitigate an impact of co-channel C/I. Per the present teachings, a gateway, or a neighboring gateway cluster, handling co-channel beams allows the use of precoding to further mitigate the deleterious effects of co-channel interference among the actively transmitting beams. Precoding is a way of manipulating the transmitted signals from the gateway to mitigate the impact of C/I. Precoding is most practical when the signals transmitted on co-channel beams are known. Precoding can reduce an impact of C/I on co-channel beams, thus permitting selection of an even more aggressive MODCOD.

Location Aware Scheduling

The present teachings disclose spectral efficiency enhancements that use knowledge of beam level statistics of C/I. In exemplary embodiments, the network scheduler may utilize location awareness of user terminals in a coverage area. When a user terminal location is known to the scheduler, spectral efficiency can be optimized. This is because the C/I experienced by a user terminal within a beam is different at different locations for a given set of interferers. In the return link, for a given location of interest, the C/I is a function of where the interferers are located.

Figure 5:
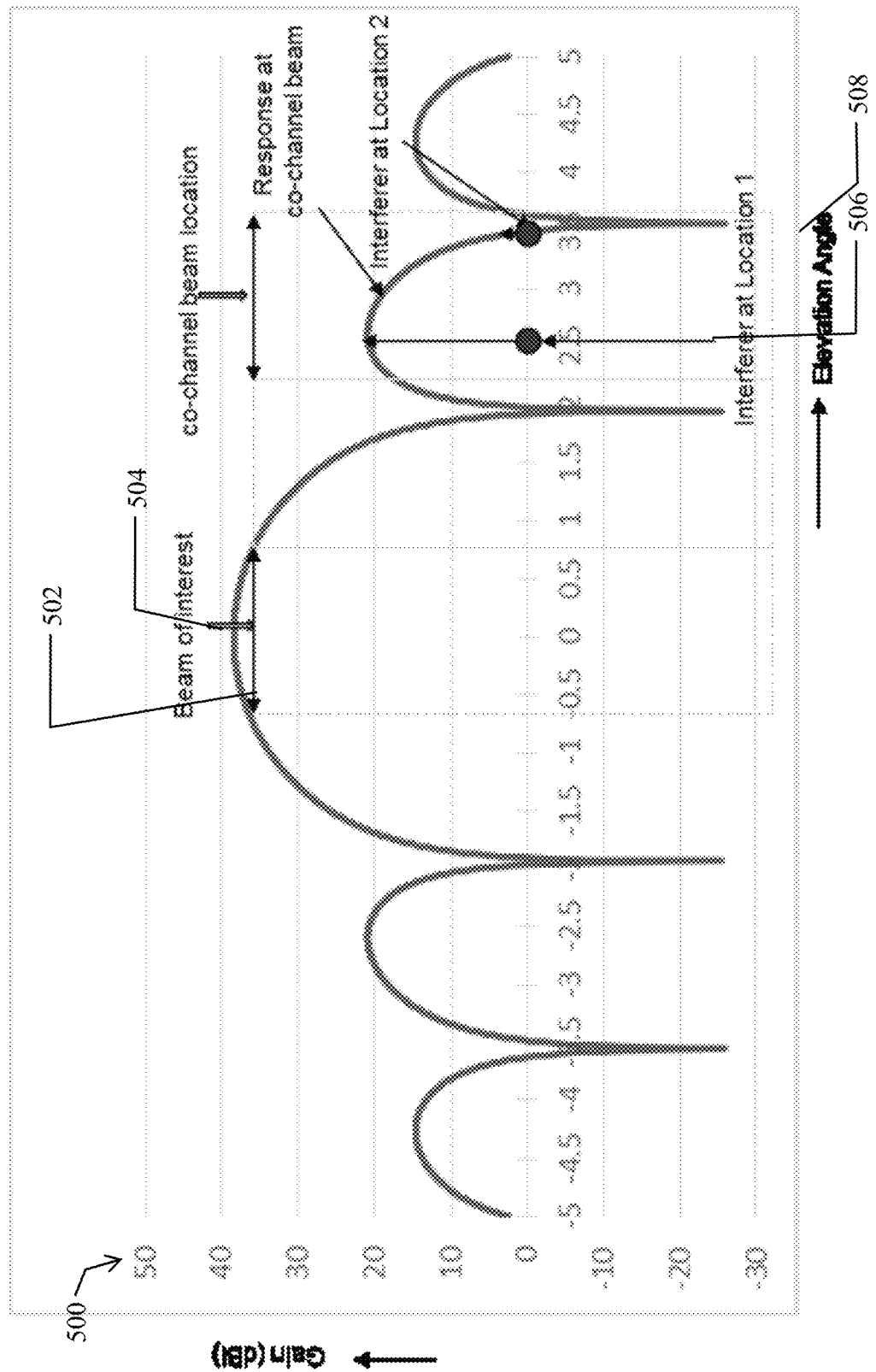
FIG. 5 illustrates Carrier to Interference ratio (C/I) dependence on a location of an interferer according to various embodiments.

FIG. 5 illustrates Carrier to Interference ratio (C/I) dependence on a location of an interferer according to various embodiments.

In FIG. 5, an azimuth cut of the satellite antenna gain for the beam of interest is shown in a return link in chart 500. FIG. 5 illustrates a response of an exemplary satellite antenna at various co-channel beam locations. Let us suppose that the user of interest is at a center 504 of a beam 502, of interest with an antenna gain of approximately 38.5 dBi. An interferer at Location 506 in the co-channel beam is interfering at about 18 dB lower than the user of interest, however, if the interferer is located at Location 506 in the co-channel beam, the interference level is more than 30 dB below the signal of interest. When the scheduler allocates return link allocation to the user of interest in the beam of interest and another user in a co-channel beam simultaneously at Location 502, the MODCOD used should be more robust compared to the case when return link allocation in the co-channel beam is at Location 508. In other words, the spectral efficiency of a user of interest can be made higher when a location of the interferer is known. Per the present teachings, the knowledge of the user of interest's location and that of the interferer permits optimization of simultaneous allocations such that an overall spectral efficiency is improved.

Improved Spectral Efficiency via Flexible Power Allocation

With the proposed multi-beam networked co-channel scheduler, power allocation can be made flexible and more efficient. Having visibility to what co-channel beams will be transmitting, the proposed scheduler can re-allocate power from the co-channel beams not having transmission to the beams with transmission using a multi-port amplifier. As an example, assuming power is evenly distributed among co-channel beams, 6 dB of more power could be re-allocated to beams with an active transmission (CC1-5 and CC1-6) of time instance 0 of FIG. 4. The increased power would improve the overall spectral efficiency and the C/(N+I) experienced by user terminals to 19.96 dB.

Figure 6:
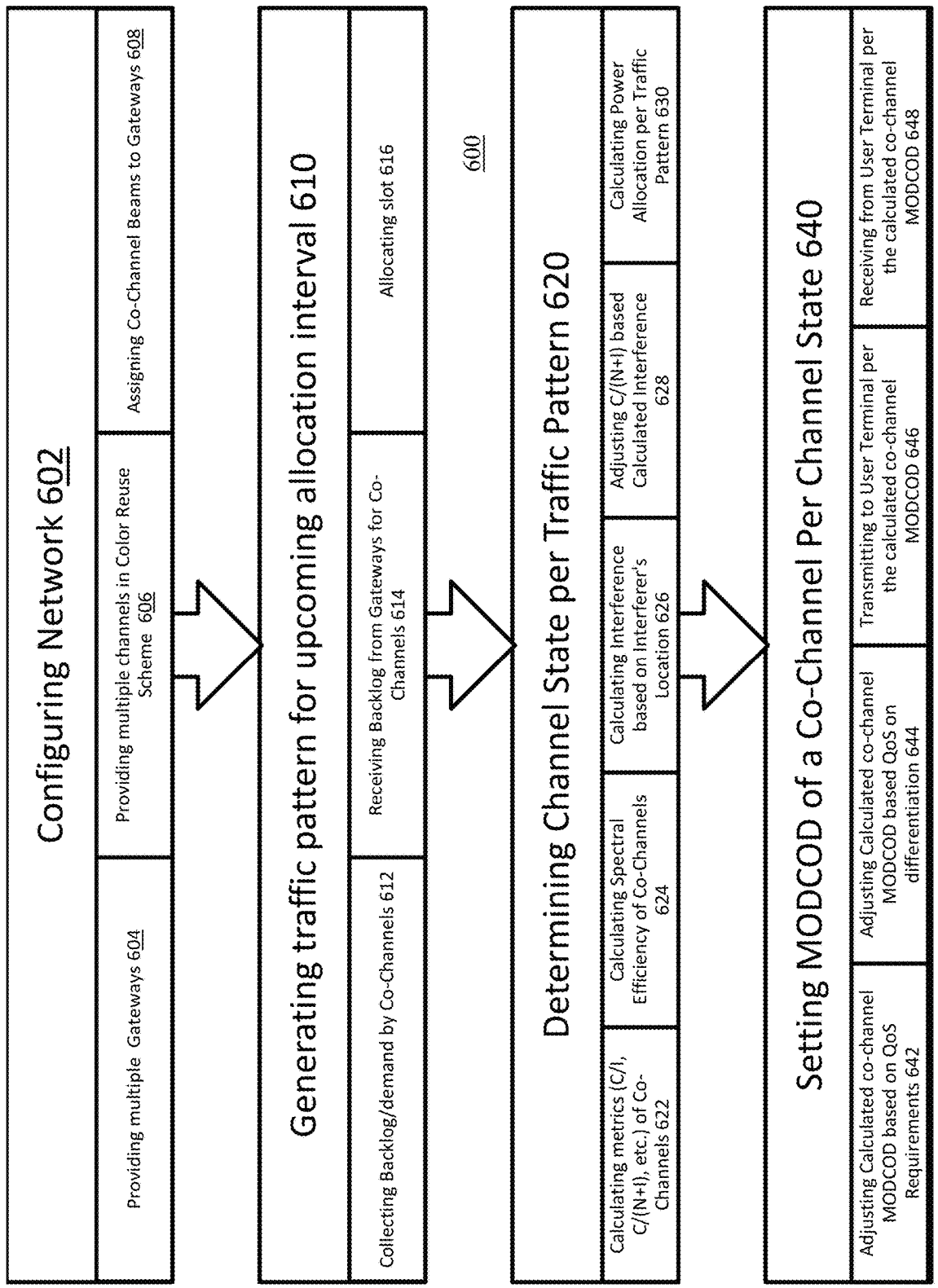
FIG. 6 illustrates a method for networked scheduling according to various embodiments.

FIG. 6 illustrates a method for networked scheduling according to various embodiments.

A method 600 for networked scheduling may be implemented using the modules and processes described above. The method 600 may include an operation 602 for configuring a network. The method 600 may include an operation 604 for providing multiple gateways. The method 600 may include an operation 606 for providing multiple channels in a color reuse scheme The method 600 may include an operation 608 for assigning co-channel beams to gateways The method 600 may include an operation 610 for generating traffic pattern for upcoming allocation slot The method 600 may include an operation 612 for collecting backlog/demand by co-channels The method 600 may include an operation 614 for receiving backlog from gateways for co-channels The method 600 may include an operation 616 for allocating a slot.

The method 600 may include an operation 620 for determining channel state per traffic pattern. The method 600 may include an operation 622 for calculating metrics (C/I, C/(N+I), etc.) of the co-channels. The method 600 may include an operation 624 for calculating a spectral efficiency of the co-channels. The method 600 may include an operation 626 for calculating interference based on an interferer's location. The method 600 may include an operation 628 for adjusting the C/(N+I) based on the calculated interference. The method 600 may include an operation 630 for calculating power allocation per traffic pattern.

The method 600 may include an operation 640 for setting the MODCOD of a co-channel per channel state. The method 600 may include an operation 642 for adjusting the co-channel calculated MODCOD based on QoS requirements. The method 600 may include an operation 644 for adjusting the calculated co-channel MODCOD based on QoS differentiation. The method 600 may include an operation 646 for transmitting to a user terminal per the calculated co-channel MODCOD. The method 600 may include an operation 648 for receiving from a user terminal per the calculated co-channel MODCOD.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. A method for networked scheduling, the method comprising:
   providing a gateway;
   a plurality of channels assigned to a color reuse scheme comprising colors, wherein some of the plurality of channels assigned to one of the colors comprise a set of co-channels;
   associating the set of co-channels with the gateway;
   generating a traffic pattern indicating one or more active co-channels for the set of co-channels for an upcoming allocation slot based on allocations;
   determining, after the generating, an expected channel metric of each of the one or more active co-channels; and
   setting, after the determining, a Modulation and Coding (MODCOD) scheme of each of the one or more active co-channels commensurate with the respective expected channel metric to increase spectral efficiency of the upcoming slot,
   wherein the determining coordinates interference mitigation in the upcoming allocation slot across the one or more active co-channels, and
   wherein the set of co-channels have a common frequency and orthogonality.

2. The method of claim 1, wherein the gateway comprises a plurality of gateways, and the method further comprises interconnecting the plurality of gateways with a high-speed, low delay link.

3. The method of claim 2, wherein
   the one of the colors is assigned to a plurality of sets of co-channels,
   each set of the plurality of sets of co-channels is assigned to one of the plurality of gateways communicating with each other over the high-speed, low delay link.

4. The method of claim 1, wherein the one of the colors is assigned to a plurality of sets of co-channels.

5. The method of claim 1, wherein the determining comprises calculating, based on the traffic pattern for the upcoming allocation slot, one or more of an active transmission indicator, a spectral efficiency, an interference, a precoding, and a power level.

6. The method of claim 1, wherein the determining comprises calculating, for each of the one or more active co-channels, an interference based on a location of the interferer.

7. The method of claim 1, wherein the determining is based on one or more of a designed physical waveform, a provisioning of Channel State Information (CSI), a reference signal, a CSI interference measurement resource spectral efficiency, a beam response, reuse factors, number of co-channel cells, and activity in co-channel cells.

8. The method of claim 1, wherein the generating comprises collecting demand for the upcoming allocation slot based on instantaneous beam transmission information.

9. The method of claim 1, wherein the generating comprises collecting demand with a high tier allocation scheduler, a mid-tier allocation scheduler, and a low-tier allocation scheduler.

10. The method of claim 1, wherein the generating comprises collecting demand for the upcoming allocation slot based on beam transmission information of a same transmission frame.

11. The method of claim 1, wherein the setting is based on Quality of Service (QoS), fairness and efficiency requirements associated with traffic being scheduled in the upcoming allocation slot.

12. The method of claim 1, further comprising adjusting the MODCOD scheme of each co-channel in the set of co-channels based on the traffic pattern of other channels in the set of co-channels.

13. A satellite communication system comprising:
   a gateway;
   a plurality of channels assigned to a color reuse scheme comprising colors, wherein some of the plurality of channels assigned to one of the colors comprise a set of co-channels;
   a global resources manager to associate the set of co-channels with the gateway;
   a scheduler to generate a traffic pattern indicating one or more active co-channels for the set of co-channels for an upcoming allocation slot based on allocations for the set of co-channels; and
   a networked scheduler to determine an expected channel metric of each of the one or more active co-channels, and to set, for the upcoming allocation slot, a Modulation and Coding (MODCOD) scheme of each of the one or more active co-channels commensurate with the respective expected channel metric to increase spectral efficiency of the upcoming slot,
   wherein the networked scheduler, to determine, coordinates interference mitigation, across the one or more active co-channels, and
   wherein the set of co-channels have a common frequency and orthogonality.

14. The system of claim 13, wherein the gateway comprises a plurality of gateways, and the system further comprises a high-speed, low delay link to interconnect the plurality of gateways.

15. The system of claim 14, wherein
   the one of the colors is assigned to a plurality of sets of co-channels,
   each set of the plurality of sets of co-channels is assigned to one of the plurality of gateways communicating with each other over the high-speed, low delay link.

16. The system of claim 13, wherein the one of the colors is assigned to a plurality of sets of co-channels.

17. The system of claim 13, wherein the networked scheduler is further configured to calculate, based on the traffic pattern for the upcoming allocation slot, one or more of an active transmission indicator, a spectral efficiency, an interference, a precoding, and a power level.

18. The system of claim 13, wherein the networked scheduler is further configured to calculate, for the one or more active co-channels, an interference based on a location of the interferer.

19. The system of claim 13, wherein the networked scheduler determines the expected channel metric based on one or more of a designed physical waveform, a provisioning of Channel State Information (CSI), a reference signal, a CSI interference measurement resource spectral efficiency, a beam response, reuse factors, number of co-channel cells, and activity in co-channel cells.

20. The system of claim 13, wherein the networked scheduler is further configured to collect demand for the upcoming allocation slot based on instantaneous beam transmission information.

21. The system of claim 13, wherein the networked scheduler is further configured to collect demand with a high tier allocation scheduler, a mid-tier allocation scheduler, and a low-tier allocation scheduler.

22. The system of claim 13, wherein the networked scheduler is further configured to collect demand for the upcoming allocation slot based on beam transmission information of a same transmission frame.

23. The system of claim 13, wherein the networked scheduler sets the MODCOD based on Quality of Service (QoS), fairness and efficiency requirements associated with traffic being scheduled in the upcoming allocation slot.

24. The system of claim 13, wherein the networked scheduler is further configured to adjust the MODCOD scheme of each co-channel in the set of co-channels based on the traffic pattern of other channels in the set of co-channels.

* * * * *